United States Patent
Shimada et al.

(10) Patent No.: US 7,911,810 B2
(45) Date of Patent: Mar. 22, 2011

(54) BI-DIRECTIONAL DC-DC CONVERTER AND METHOD FOR CONTROLLING THE SAME

(75) Inventors: Takae Shimada, Hitachi (JP); Yoshihide Takahashi, Odawara (JP); Kimiaki Taniguchi, Hadano (JP); Hiroyuki Shoji, Hitachi (JP)

(73) Assignee: Hitachi Computer Peripherals, Co., Ltd., Kanagawa-Ken (JP)

( * ) Notice: Subject to any disclaimer, the term of this patent is extended or adjusted under 35 U.S.C. 154(b) by 0 days.

(21) Appl. No.: 12/896,176

(22) Filed: Oct. 1, 2010

(65) Prior Publication Data

US 2011/0019440 A1    Jan. 27, 2011

Related U.S. Application Data

(63) Continuation of application No. 12/193,244, filed on Aug. 18, 2008.

(30) Foreign Application Priority Data

Aug. 28, 2007  (JP) .................................. 2007-221892

(51) Int. Cl.
*H02M 3/335*    (2006.01)
*H02H 7/10*    (2006.01)

(52) U.S. Cl. ......................... 363/17; 363/21.02; 363/127
(58) Field of Classification Search ..................... 363/17, 363/21.02, 52, 53, 56.05, 89, 98, 127, 132
See application file for complete search history.

(56) References Cited

U.S. PATENT DOCUMENTS

| 5,255,174 | A | 10/1993 | Murugan |
| 6,304,461 | B1 | 10/2001 | Walker |
| 6,370,050 | B1 | 4/2002 | Peng et al. |
| 7,177,163 | B2 | 2/2007 | Eguchi et al. |
| 7,599,198 | B2 * | 10/2009 | Tao et al. ......................... 363/17 |
| 7,692,935 | B2 | 4/2010 | Yamauchi et al. |
| 7,706,156 | B2 * | 4/2010 | Hsieh et al. ................. 363/21.02 |

* cited by examiner

*Primary Examiner* — Gary L Laxton
(74) *Attorney, Agent, or Firm* — Antonelli, Terry, Stout & Kraus, LLP.

(57) ABSTRACT

A bi-directional DC-DC converter has a transformer for connecting a voltage type full bridge circuit connected to a first power source and a current type switching circuit connected to a second power source. A voltage clamping circuit constructed by switching elements and a clamping capacitor is connected to the current type switching circuit. The converter has a control circuit for cooperatively making switching elements operative so as to control a current flowing in a resonance reactor.

2 Claims, 6 Drawing Sheets

US 7,911,810 B2

BI-DIRECTIONAL DC-DC CONVERTER AND METHOD FOR CONTROLLING THE SAME

CROSS-REFERENCE TO RELATED APPLICATIONS

This application is a continuation of U.S. application Ser. No. 12/193,244, filed Aug. 18, 2008 and which present application claims priority from Japanese patent application No. JP 2007-221892 filed on Aug. 28, 2007, the contents of which are hereby incorporated by reference into this application.

BACKGROUND OF THE INVENTION

1. Field of the Invention

The invention relates to a bi-directional DC-DC converter having an insulating function and a method for controlling such a converter.

2. Description of the Related Arts

In recent years, hybrid vehicles having high efficiency have been being spread due to an increase in consciousness of conservation of the global environment. The hybrid automobile has a main battery for driving a motor and a battery for auxiliaries. If an electric power can be mutually supplied between the two batteries of different voltages, design flexibility of a vehicle power supply systems can be increased.

A bi-directional DC-DC converter for bi-directionally converting electric powers between two power sources of different voltages has been disclosed in JP-A-2002-165448. In the bi-directional DC-DC converter disclosed in Patent Document 1, a voltage type circuit on a high voltage side and a current type circuit on a low voltage side having a choke coil are connected through a transformer. By making a switching element of the high voltage side circuit operative, the electric power is supplied from the high voltage side power source to the low voltage side power source. By making a switching element of the low voltage side circuit operative, the electric power is supplied from the low voltage side power source to the high voltage side power source.

Further, a bi-directional DC-DC converter in which a voltage clamping circuit including an object connection in series of a switching element and a capacitor is connected to a low voltage side circuit has been disclosed in JP-A-2006-187147. In the bi-directional DC-DC converter disclosed in Patent Document 2, at the time of a step-down operation, a loss caused by a circulating current is reduced by the voltage clamping circuit. A high efficient and small bi-directional DC-DC converter in which, at the time of the step-up/down operations, the generation of a surge voltage in the low voltage side circuit is prevented and a withstanding voltage of the switching element is reduced is provided.

In the bi-directional DC-DC converter in the related art disclosed in JP-A-2002-165448, since not only the efficiency is deteriorated by a loss due to a circulating current at the time of the step-down operation but also it is necessary to raise a withstanding voltage of the switching element by surge voltages caused in the low voltage side circuit at the time of the step-up/down operations, they become an obstacle to realization of miniaturization and high efficiency.

In the bi-directional DC-DC converter in the related art disclosed in Patent Document 2 (JP-A-2006-187147), when a step-up voltage ratio/output electric power is large at the time of the step-up operation, it is also necessary to raise the withstanding voltage of the switching element in the low voltage side circuit and it becomes an obstacle to realization of miniaturization and high efficiency.

SUMMARY OF THE INVENTION

It is one of objects of the invention to provide a small and high efficient bi-directional DC-DC converter in which even when a step-up voltage ratio/output electric power is large at the time of a step-up operation, a voltage which is applied to a switching element in a low voltage side circuit is reduced.

Another object of the invention is to provide a small bi-directional DC-DC converter in which a large electric power can be outputted even at the time of a step-down operation.

To accomplish the above object, according to the invention, there is provided a bi-directional DC-DC converter which comprises a high voltage side switching circuit, connected between a first DC power source and a transformer, for executing an electric power conversion between a direct current and an alternating current, a low voltage side switching circuit, connected between a second DC power source and the transformer, for executing an electric power conversion between a direct current and an alternating current, and a control circuit for controlling ON/OFF of switching elements included in each of the switching circuits and in which an electric power is transmitted and received between the first and second DC power sources, wherein the high voltage side switching circuit includes a first vertical arm in which a first upper arm switching element and a first lower arm switching element are serially connected, a second vertical arm in which a second upper arm switching element and a second lower arm switching element are serially connected, a first smoothing capacitor connected in parallel to the first and second vertical arms and the first DC power source, and a series connector which is connected between a series node of the first upper arm switching element and the first lower arm switching element and a serial node of the second upper arm switching element and the second lower arm switching element and is constructed by a resonance capacitor, a resonance reactor, and a primary winding of the transformer, the low voltage side switching circuit includes a first switching element group which is connected to the second DC power source and a secondary winding of the transformer and includes a plurality of switching elements, a smoothing reactor connected to the first switching element group and/or the secondary winding of the transformer, a second smoothing capacitor in which one end is connected to one end of each of the switching elements included in the first switching element group and the other end is connected to one end of the smoothing reactor and which is connected in parallel to the second DC power source, and a voltage clamping circuit which is connected to the switching elements included in the first switching element group and has a second switching element group including at least one switching element and a clamping capacitor, and the control circuit includes first switching means for switching the switching elements in an OFF state in the second switching element group to ON for a period of time during which both of the first upper arm switching element and the second lower arm switching element are in an ON state and second switching means for switching the first lower arm switching element and the second upper arm switching element to ON while keeping the switching elements switched to ON by the first switching means in the ON state.

According to the embodiment of the invention, the control circuit further includes means for switching the first lower arm switching element and the second upper arm switching element to ON while keeping the switching elements switched to ON by the first switching means in the ON state and, after a direction of a current flowing in the primary winding was reversed, switching the switching elements in the ON state to OFF.

According to the embodiment of the invention, the control circuit further includes: third switching means for switching the switching elements in the OFF state in the second switching element group to ON for a period of time during which both of the first lower arm switching element and the second upper arm switching element are in the ON state; and fourth switching means for switching the first upper arm switching element and the second lower arm switching element to ON while keeping the switching elements switched to ON by the third switching means in the ON state.

According to the embodiment of the invention, the control circuit further includes means for switching the first upper arm switching element and the second lower arm switching element to ON while keeping the switching elements switched to ON by the third switching means in the ON state and, after a direction of a current flowing in the primary winding was reversed, switching the switching elements in the ON state to OFF.

According to the embodiment of the invention, a voltage which is substantially twice as large as the first DC power source is applied to the series connector of the resonance reactor and the resonance capacitor for a period of time during which the switching elements switched to ON by the first or third switching means are in the ON state.

According to the invention, there is provided a bi-directional DC-DC converter which comprises a high voltage side switching circuit, connected between a first DC power source and a transformer, for executing an electric power conversion between a direct current and an alternating current, a low voltage side switching circuit, connected between a second DC power source and the transformer, for executing an electric power conversion between a direct current and an alternating current, and a control circuit for controlling ON/OFF of switching elements included in each of the switching circuits and in which an electric power is transmitted and received between the first and second DC power sources, wherein the high voltage side switching circuit includes a first vertical arm in which a first upper arm switching element and a first lower arm switching element are serially connected, a second vertical arm in which a second upper arm switching element and a second lower arm switching element are serially connected, a first smoothing capacitor connected in parallel to the first and second vertical arms and the first DC power source, and a series connector which is connected between a serial node of the first upper arm switching element and the first lower arm switching element and a serial node of the second upper arm switching element and the second lower arm switching element and is constructed by a resonance capacitor, a resonance reactor, and a primary winding of the transformer, the low voltage side switching circuit includes a first switching element group which is connected to the second DC power source and a secondary winding of the transformer and includes a plurality of switching elements, a smoothing reactor connected to the first switching element group and/or the secondary winding of the transformer, a second smoothing capacitor in which one end is connected to one end of each of the switching elements included in the first switching element group and the other end is connected to one end of the smoothing reactor and which is connected in parallel to the second DC power source, and a voltage clamping circuit which is connected to the switching elements included in the first switching element group and has a second switching element group including at least one switching element and a clamping capacitor, and the control circuit includes means for switching one of the first and second upper or lower arm switching elements for a period of time during which an energy is supplied to the first DC power source and control means for controlling timing for switching from a period of time during which an energy is accumulated from the second DC power source into the smoothing reactor to a period of time during which the energy is emitted and timing for switching the upper or lower arm switching element in the ON state to OFF in accordance with the energy which is supplied to the first DC power source.

According to the embodiment of the invention, the control means switches the upper or lower arm switching element in the ON state to OFF and, after a direction of a current flowing in the primary winding was reversed, switches the switching elements in the ON state in the first switching element group to OFF, and switches a state of the energy in the smoothing reactor from the accumulation to the emission.

According to the embodiment of the invention, the control means controls a time which is necessary until the upper or lower arm switching element in the ON state is switched to OFF and the energy is supplied to the first DC power source after the switching elements in the ON state in the first switching element group were switched to OFF, thereby adjusting an amount of energy which is supplied to the first DC power source.

According to the embodiment of the invention, the control circuit further includes: means for switching two of the first and second upper or lower arm switching elements to ON for the period of time during which the energy is supplied to the first DC power source; means for switching one of the upper and lower arm switching elements in the ON state to OFF after a direction of a current flowing in the primary winding was reversed; and means for switching the upper or lower arm switching elements in the ON state to OFF after the switching elements in the ON state in the first switching element group were switched to OFF and a state of the energy in the smoothing reactor was switched from the accumulation to the emission.

According to the embodiment of the invention, the first switching element group includes fifth to eighth switching elements, the second switching element group includes a ninth switching element, the voltage clamping circuit includes a series connector of the ninth switching element and the clamping capacitor, and the low voltage side switching circuit includes a third vertical arm in which the fifth and sixth switching elements are serially connected and a fourth vertical arm in which the seventh and eighth switching elements are serially connected and is constructed in such a manner that the secondary winding is connected between a serial node of the fifth and sixth switching elements and a serial node of the seventh and eighth switching elements, the third and fourth vertical arms and the voltage clamping circuit are connected in parallel, one end of the smoothing reactor is connected to one end of the voltage clamping circuit, one end of the second smoothing capacitor is connected to the other end of the smoothing reactor, and the other end of the voltage clamping circuit is connected to the other end of the second smoothing capacitor.

According to the embodiment of the invention, the first switching element group includes fifth and sixth switching elements, the second switching element group includes seventh and eighth switching elements, the voltage clamping circuit is constructed by connecting one end of each of the seventh and eighth switching elements and one end of the clamping capacitor, the secondary winding has a connector of one end of a first secondary winding and one end of a second secondary winding, and the low voltage side switching circuit is constructed in such a manner that one end of the fifth switching element and the other end of the seventh switching element are connected to the other end of the first secondary winding, one end of the sixth switching element and the other end of the eighth switching element are connected to the other end of the second secondary winding, the other end of the fifth switching element and the other end of the sixth switching element are connected to the other end of the clamping capacitor, and a series connector of the smoothing reactor and the second smoothing capacitor is connected between a node of the fifth and sixth switching elements and a node of the first and second secondary windings.

According to the embodiment of the invention, the first switching element group includes fifth and sixth switching elements, the second switching element group includes seventh and eighth switching elements, the voltage clamping circuit is constructed by connecting one end of the seventh switching element, one end of the eighth switching element, and one end of the clamping capacitor, the smoothing reactor is constructed by connecting one end of a first smoothing reactor and one end of a second smoothing reactor, and the low voltage side switching circuit is constructed in such a manner that one end of the fifth switching element, the other end of the seventh switching element, and the other end of the first smoothing reactor are connected to one end of the secondary winding, one end of the sixth switching element, the other end of the eighth switching element, and the other end of the second smoothing reactor are connected to the other end of the secondary winding of the transformer, the other end of the fifth switching element and the other end of the sixth switching element are connected to the other end of the clamping capacitor, and the second smoothing capacitor is connected between a node of the fifth and sixth switching elements and a node of the first and second smoothing reactors.

According to the embodiment of the invention, the clamping capacitor and the second smoothing capacitor are connected.

According to the embodiment of the invention, the resonance reactor has a leakage inductance and a wiring inductance of the transformer and includes first, second, and third resonance reactors which are respectively serially connected to the primary winding and the secondary winding and are magnetically coupled therewith, and the resonance capacitor includes first, second, and third resonance capacitors which are respectively serially connected to the primary winding and the secondary winding.

According to the embodiment of the invention, each of the switching elements has diodes which are connected in inverse parallel and snubber capacitors which are connected in parallel.

According to the invention, there is provided a control method of controlling a DC-DC converter which comprises a high voltage side switching circuit, connected between a first DC power source and a transformer, for executing an electric power conversion between a direct current and an alternating current, a low voltage side switching circuit, connected between a second DC power source and the transformer, for executing an electric power conversion between a direct current and an alternating current, and a control circuit for controlling ON/OFF of switching elements included in each of the switching circuits and in which the high voltage side switching circuit includes a first vertical arm in which a first upper arm switching element and a first lower arm switching element are serially connected, a second vertical arm in which a second upper arm switching element and a second lower arm switching element are serially connected, a first smoothing capacitor connected in parallel to the first and second vertical arms and the first DC power source, and a series connector which is connected between a serial node of the first upper arm switching element and the first lower arm switching element and a serial node of the second upper arm switching element and the second lower arm switching element and is constructed by a resonance capacitor, a resonance reactor, and a primary winding of the transformer, and the low voltage side switching circuit includes a first switching element group which is connected to the second DC power source and a secondary winding of the transformer and includes a plurality of switching elements, a smoothing reactor connected to the first switching element group and/or the secondary winding of the transformer, a second smoothing capacitor in which one end is connected to one end of each of the switching elements included in the first switching element group and the other end is connected to one end of the smoothing reactor and which is connected in parallel to the second DC power source, and a voltage clamping circuit which is connected to the switching elements included in the first switching element group and has a second switching element group including at least one switching element and a clamping capacitor, comprising the steps of: switching the switching elements in an OFF state in the second switching element group to ON for a period of time during which both of the first upper arm switching element and the second lower arm switching element are in an ON state; and switching the first lower arm switching element and the second upper arm switching element to ON while keeping the switching elements switched to ON in the ON state.

According to the invention, there is provided a control method of controlling a DC-DC converter which comprises a high voltage side switching circuit, connected between a first DC power source and a transformer, for executing an electric power conversion between a direct current and an alternating current, a low voltage side switching circuit, connected between a second DC power source and the transformer, for executing an electric power conversion between a direct current and an alternating current, and a control circuit for controlling ON/OFF of switching elements included in each of the switching circuits and in which the high voltage side switching circuit includes a first vertical arm in which a first upper arm switching element and a first lower arm switching element are serially connected, a second vertical arm in which a second upper arm switching element and a second lower arm switching element are serially connected, a first smoothing capacitor connected in parallel to the first and second vertical arms and the first DC power source, and a series connector which is connected between a serial node of the first upper arm switching element and the first lower arm switching element and a serial node of the second upper arm switching element and the second lower arm switching element and is constructed by a resonance capacitor, a resonance reactor, and a primary winding of the transformer, and the low voltage side switching circuit includes a first switching element group which is connected to the second DC power source and a secondary winding of the transformer and includes a plurality of switching elements, a smoothing reactor connected to the first switching element group and/or the secondary winding of the transformer, a second smoothing capacitor in which one end is connected to one end of each of the switching elements included in the first switching element group and the other end is connected to one end of the smoothing reactor and which is connected in parallel to the second DC power source, and a voltage clamping circuit which is connected to the switching elements included in the first switching element group and has a second switching element group including at least one switching element and a clamping capacitor, comprising: a first step of switching one of the first and second upper or lower arm switching elements for a period of time during which an energy is supplied to the first DC power source; a second step of switching from a period of time during which an energy is accumulated from the second DC power source into the smoothing reactor to a period of time during which the energy is emitted; and a third step of switching the upper or lower arm switching element in an ON state to OFF, wherein timing for the second step and timing for the third step are controlled in accordance with the energy which is supplied to the first DC power source.

In the control method for the bi-directional DC-DC converter according to the invention, the control processes of the control circuit included in the bi-directional DC-DC converter according to any one of the above embodiments are selectively switched in accordance with a propagating direction of the energy, an input voltage, an input current, an output voltage, and an output current.

According to the preferred embodiments of the invention, the small and high efficient bi-directional DC-DC converter constructed in such a manner that even when the step-up voltage ratio/output electric power is large at the time of the step-up operation, the voltage which is applied to the switching element of the low voltage side circuit is reduced can be provided.

According to the preferred embodiments of the invention, the small and high efficient bi-directional DC-DC converter which can output the large electric power even at the time of the step-down operation can be provided.

Other objects and features of the present invention will be apparent from the following description of embodiments.

DESCRIPTION OF THE EMBODIMENTS

Figure 1:
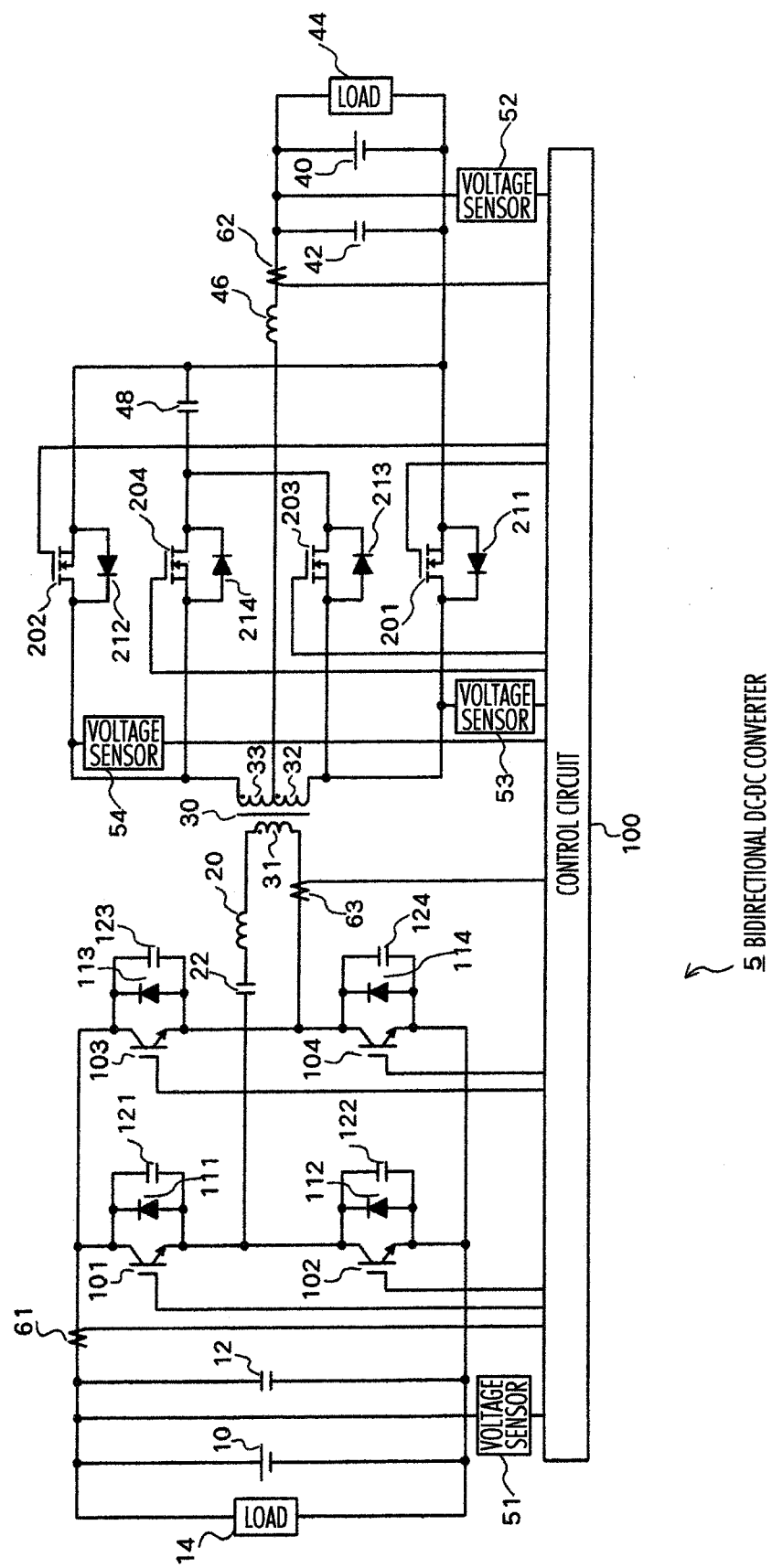
FIG. 1 is a circuit constructional diagram of a bi-directional DC-DC converter according to an embodiment of the invention.

An embodiment of the invention will be described in detail with reference to the drawings. The same or corresponding portions in the drawings are designated by the same reference numerals. In the embodiment, although it is assumed that an IGBT and a MOSFET are used as switching elements as an example, the invention is not limited to them. A voltage of the switching element in an ON state or a voltage which is almost equal to or lower than a forward drop voltage of a diode is assumed to be a zero voltage.

FIG. 1 is a circuit constructional diagram of a bi-directional DC-DC converter 5 according to the embodiment of the invention. In FIG. 1, a smoothing capacitor 12, a load 14, a first switching arm in which an emitter of an IGBT 101 and a collector of an IGBT 102 are connected, and a second switching arm in which an emitter of an IGBT 103 and a collector of an IGBT 104 are connected are connected in parallel to a power source 10 on a high voltage side.

Each of diodes 111 to 114 is connected between a collector and an emitter of each of the IGBTs 101 to 104 so as to allow a current to flow from the emitter side to the collector side. In the case of using the MOSFET in place of the IGBT, body diodes may be used as diodes 111 to 114. Each of snubber capacitors 121 to 124 is connected between the collector and the emitter of each of the IGBTs 101 to 104.

A primary winding 31 of a transformer 30, a resonance reactor 20, and a resonance capacitor 22 are serially connected between a node of the IGBTs 101 and 102 and a node of the IGBTs 103 and 104. The resonance reactor 20 may be replaced by a leakage inductance and a wiring inductance of the transformer 30 here.

A smoothing capacitor 42 and a load 44 are connected in parallel to a power source 40 on the low voltage side. One end of a secondary winding 32 of the transformer 30, one end of a secondary winding 33 of the transformer 30, and one end of a smoothing reactor 46 are connected. The other end of the smoothing reactor 46 is connected to a positive polarity of the power source 40. The other end of the secondary winding 32 is connected to a drain of a MOSFET 201. The other end of the secondary winding 33 is connected to a drain of a MOSFET 202. A source of the MOSFET 201 and a source of the MOSFET 202 are connected to a negative polarity of the power source 40.

In a voltage clamping circuit in which a drain of a MOSFET 203, a drain of a MOSFET 204, and one end of a clamping capacitor 48 are connected, a source of the MOSFET 203 is connected to the drain of the MOSFET 201, a source of the MOSFET 204 is connected to the drain of the MOSFET 202, and the other end of the clamping capacitor 48 is connected to the negative polarity of the power source 40.

Each of diodes 211 to 214 is connected between the drain and the source of each of the MOSFETs 201 to 204 so as to allow a current to flow from the source side to the drain side. Body diodes of MOSFETs can be also used as diodes 211 to 214. Each snubber capacitors may be connected between the drain and the source of each of the MOSFETs 201 to 204.

The IGBTs 101 to 104 and MOSFETs 201 to 204 are switching-controlled by a control circuit 100. Voltage sensors 51 to 54 and current sensors 61 to 63 are connected to the control circuit 100.

Prior to describing the operation in detail, voltages and currents in the circuit diagram of FIG. 1 will be defined. First, as for collector-emitter voltages V(101) to V(104) of the IGBTs 101 to 104, the collector is set to be positive and, as for gate-source voltages Vg(101) to Vg(104), the gate is set to be positive. Synthetic currents flowing in the IGBTs 101 to 104 and the diodes 111 to 114 connected in parallel therewith are respectively assumed to be I(101) to I(104) when a direction of the current flowing from the collector to the emitter of each of the IGBTs 101 to 104 is set to be positive.

As for drain-source voltages V(201) to V(204) of the MOSFETs 201 to 204, the drain is set to be positive and, as for gate-source voltages Vg(201) to Vg(204), the gate is set to be positive. Synthetic currents flowing in the MOSFETs 201 to 204 and the diodes 211 to 214 connected in parallel therewith are respectively assumed to be I(201) to I(204) when a direction of the current flowing from the drain to the source of each of the MOSFETs 201 to 204 is set to be positive.

As for a voltage V(22) of the resonance capacitor 22, a voltage V(20) of the resonance reactor 20, and a voltage V(31) of the primary winding 31, a direction of the voltage applied from the second switching arm to the first switching arm is set to be positive. As for a current I(20) flowing in the resonance reactor 20, a direction of the current flowing from the first switching arm to the second switching arm is set to be positive.

As for a current I(48) flowing in the clamping capacitor 48, a direction of the current flowing from a node of the MOSFETs 203 and 204 to the negative polarity of the power source 40 is set to be positive. A voltage of the drain of each of the MOSFETs 203 and 204 in the case of setting the negative polarity of the power source 40 to a reference is assumed to be a voltage V(48) of the clamping capacitor 48.

A direction of a current I(46) flowing in the smoothing reactor 46 is defined as follows. In the case of the step-down operation for feeding the energy of the power source 10 to the power source 40, a direction of the voltage applied from a node of the secondary winding 32 and the secondary winding 33 to the positive polarity of the power source 40 is set to be positive. In the case of the step-up operation for feeding the energy of the power source 40 to the power source 10, a direction of the voltage applied from the positive polarity of the power source 40 to the node of the secondary winding 32 and the secondary winding 33 is set to be positive. As for a direction of a voltage V(46) of the smoothing reactor 46, in the case of each of the step-down operation and the step-up operation, a direction adapted to accelerate the current I(46) in the smoothing reactor 46 in the positive direction is set to be positive.

The operation of the bi-directional DC-DC converter 5 according to the embodiment of the invention will be described in detail hereinbelow with reference to the drawings. In this instance, the operation for feeding the energy of the power source 10 to the power source 40 is assumed to be the step-down operation and the operation for feeding the energy of the power source 40 to the power source 10 is assumed to be the step-up operation.

First, the step-down operation which is executed by the bi-directional DC-DC converter 5 will be described.
[Step-Down Operation 1]

Figure 2:
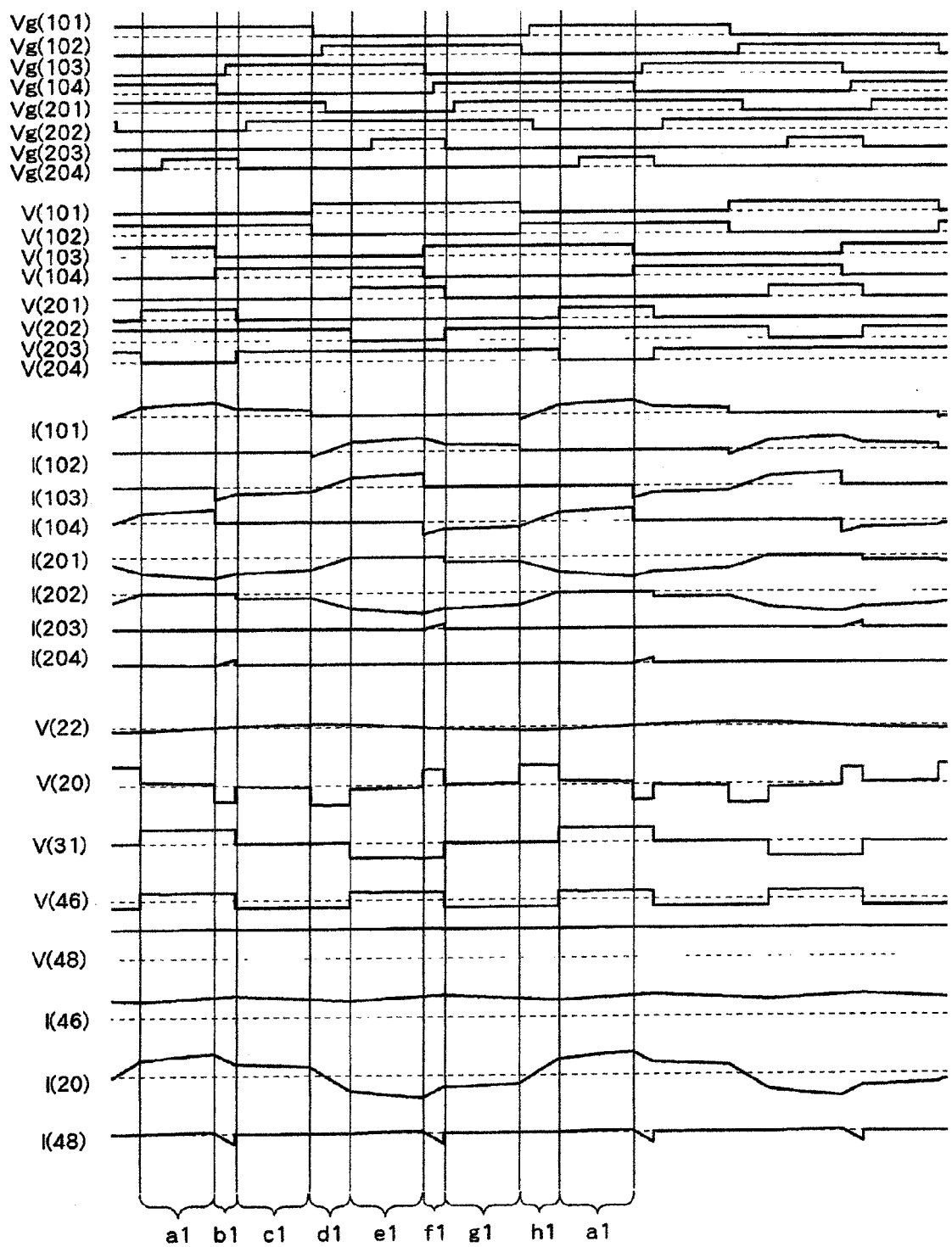
FIG. 2 is a voltage/current waveform diagram for describing the step-down operation 1 of the bi-directional DC-DC converter according to the embodiment of the invention.

FIG. 2 is a voltage/current waveform diagram for describing the step-down operation 1. The step-down operation 1 will be explained in detail hereinbelow with reference to FIG. 2. In FIG. 2, a1 to h1 denote periods of time.
(Period of Time a1)

First, for the period of time a1, the IGBTs 101 and 104 are in the ON state, the IGBTs 102 and 103 are in the OFF state, and the voltage of the power source 10 is applied to primary winding 31 of the transformer 30 through the IGBTs 101 and 104, resonance capacitor 22, and resonance reactor 20. The MOSFETs 202 and 203 are in the OFF state, the voltage developed in the secondary winding 32 is applied to the smoothing reactor 46 through the power source 40 and diode 211, the current I(46) increases gradually, and the energy is supplied to the power source 40. The voltages developed in the secondary windings 32 and 33 are applied to the clamping capacitor 48 through the diodes 214 and 211, so that the clamping capacitor 48 is charged.

Although the currents I(201) and I(204) are negative, assuming that the MOSFETs 201 and 204 are in the ON state at this time, by shunting the currents flowing in the diodes 211 and 214 to the MOSFETs 201 and 204, the loss can be reduced. Such an operation that when a forward current of the diode flows in the diode which has been connected in inverse parallel with the MOSFET or the body diode of the MOSFET, this MOSFET is set to ON and the loss is reduced as mentioned above is hereinbelow referred to as a synchronous rectification. At this time, the MOSFET 204 is held in the ON state (zero voltage switching).
(Period of time b1)

For the period of time b1, the IGBT 104 is turned off and, thereafter, the IGBT 103 is turned on. When the IGBT 104 is turned off, the current I(20) which has been flowing in the IGBT 104 discharges the snubber capacitor 123 while charging the snubber capacitor 124. When the voltage V(103) reaches the zero voltage, the diode 113 is made conductive. At this time, the IGBT 103 is turned on (zero voltage switching). The current I(20) is refluxed by a path passing through the resonance reactor 20, primary winding 31, diode 113, IGBT 101, and resonance capacitor 22. The current flowing in the primary winding 31 as mentioned above is hereinbelow referred to as a circulating current.

Since the MOSFET 204 is in the ON state, the current I(201) is negative, and the voltage V(201) is equal to the zero voltage, the voltage V(48) of the clamping capacitor 48 is applied to the secondary windings 32 and 33. The voltage developed in the primary winding 31 is applied to the resonance reactor 20 and gradually decreases the current I(20). Therefore, the circulating current decreases and the energy which is lost on the path through which the circulating current flows can be reduced. In association with the decrease in circulating current, a discharge current of the clamping capacitor 48 increases. At this time, since the voltage has been developed in the secondary winding 32, in a manner similar to the period of time a1, the voltage is applied to the smoothing reactor 46, the current I(46) increases gradually, and the energy is supplied to the power source 40.
(Period of Time c1)

For the period of time c1, the MOSFET 204 is turned off and, thereafter, the MOSFET 202 is turned on. When the MOSFET 204 is turned off, the discharge of the clamping capacitor 48 is finished and the decrease in circulating current also becomes gentle. However, since charges have been accumulated in the resonance capacitor 22 and the voltage has been developed in the direction adapted to reduce the circulating current, the circulating current decreases gently. The current which has been flowing in the MOSFET 204 is commutated to the diode 212. At this time, by turning on the MOSFET 202, the synchronous rectification is performed.

The energy accumulated in the smoothing reactor 46 is supplied to the power source 40 and the current I(46) decreases gradually. Although the current I(46) had been flowing on the path passing through the diode 211 (MOSFET 201) and secondary winding 32 for the period of time a1, since the circulating current has been reduced for the period of time b1, the current is also shunted to a path passing through the diode 212 (MOSFET 202) and secondary winding 33 for the period of time c1. The more the circulating current is reduced, the more the current is equivalently shunted to those two paths. Consequently, the conduction loss can be reduced.

The more the circulating current is reduced, the more the conduction loss can be reduced. However, for a period of time d1, which will be described hereinafter, the circulating current of a certain amount has to be left in order to enable the IGBT 102 to perform the zero voltage switching. A circulating current value necessary to enable the IGBT 102 to perform the zero voltage switching can be arithmetically operated from a voltage of the power source 10 (voltage sensor 51), an electrostatic capacitance of the resonance capacitor 22, an inductance of the resonance reactor 20, electrostatic capacitances of the snubber capacitors 121 to 124, and a dead time of the IGBTs 101 and 102 (or a dead time of the IGBTs 103 and 104).

In order to control the circulating current so as to have the circulating current value obtained by the above arithmetical operation, off timing for the MOSFET 204 has to be accurately decided. Such timing can be arithmetically operated on the basis of an off time lag of the IGBT 104 and the MOSFET 204 from the voltage of the power source 40 (voltage sensor 52), the current I(46) in the smoothing reactor 46 (current sensor 62), and a turn ratio of the transformer 30 in addition to the information which has been used in order to obtain the circulating current value necessary to enable the IGBT 102 to perform the zero voltage switching in the above process, or the off timing for the MOSFET 204 may be determined on the basis of a measurement value from the current sensor 61 showing the input current of a full bridge and a measurement value from the current sensor 63 showing the circulating current.

(Period of Time d1)

For the period of time d1, the IGBT 101 is turned off and, thereafter, the IGBT 102 is turned on and the MOSFET 201 is turned off. When the IGBT 101 is turned off, the circulating current which has been flowing in the IGBT 101 discharges the snubber capacitor 122 while charging the snubber capacitor 121. When the voltage V(102) reaches the zero voltage, the diode 112 is made conductive. At this time, the IGBT 102 is turned on (zero voltage switching). The MOSFET 201 is turned off before the period of time d1 is finished. The circulating current flows in the diode 112, resonance capacitor 22, resonance reactor 20, primary winding 31, and diode 113 and reaches the power source 10. The voltage of the power source 10 is applied to the resonance reactor 20 and the circulating current decreases.

Since the IGBTs 102 and 103 are in the ON state, after the circulating current reached zero, the circulating current increases in the reverse direction. In association with it, the current flowing through the diode 211 (MOSFET 201) and the secondary winding 32 decreases and the current flowing through the diode 212 (MOSFET 202) and the secondary winding 33 increases. The MOSFET 201 is turned off before the current flowing through the secondary winding 32 reaches zero (the current flowing through the secondary winding 33 reaches the current I(46)).

(Period of Time e1)

For the period of time e1, the MOSFET 203 is turned on. When the current flowing through the secondary winding 32 reaches zero, the diode 211 is reversely made conductive and, thereafter, reversely recovered. The current which had been flowing during the reverse conduction is commutated to the diode 213 after the diode 211 was reversely recovered. At this time, the MOSFET 203 is turned on (zero voltage switching).

When the diode 211 is reversely recovered, the drain voltage of the MOSFET 201 rises. Therefore, the MOSFET 203 can be also turned on by detecting such a voltage increase by the voltage sensor 53.

In the converter circuit in the related art having no voltage clamping circuit, when the diode 211 is reversely recovered, there is a case where a surge voltage is generated in the drain voltage of the MOSFET 201. In the embodiment, however, the clamping capacitor 48 suppresses the generation of the surge voltage.

The voltage of the power source 10 has been applied to the primary winding 31 of the transformer 30 through the IGBTs 102 and 103, resonance capacitor 22, and resonance reactor 20. The MOSFETs 201 and 204 are in the OFF state, the voltage developed in the secondary winding 33 is applied to the smoothing reactor 46 through the power source 40 and diode 212, the current I(46) increases gradually, and the energy is supplied to the power source 40. The voltages developed in the secondary windings 32 and 33 are applied to the clamping capacitor 48 through the diodes 213 and 212, thereby charging the clamping capacitor 48.

The operation for the period of time e1 is symmetrical with the operation for the period of time a1. Subsequently, after the periods of time f1 to h1, the operation cycle is returned to the period of time a1. Since the operations for the periods of time f1 to h1 are symmetrical with those for the periods of time b1 to d1, their detailed description is omitted here.

Since the voltage is developed in the resonance capacitor 22 in the direction adapted to raise the voltage which is applied to the primary winding 31 for the periods of time a1 and e1 mentioned above, the resonance capacitor 22 provides an effect of increasing the output electric power.

When the diodes 211 and 212 are reversely recovered, the voltage clamping circuit suppresses the generation of the surge voltage as mentioned above. Therefore, the voltage clamping circuit has such an effect that elements of a low withstanding voltage can be used as diodes 211 and 212 and MOSFETs 201 and 202.

Since the circulating current exists, the zero voltage switching at the time of turning on the IGBTs 101 and 102 can be realized as mentioned above. Therefore, since the circulating current decreases at the time of the small load, it is difficult to perform the zero voltage switching. To solve such a problem, for example, if the MOSFET 204 is turned off and the MOSFET 204 is turned on for the periods of time b1 and c1 prior to turning off the IGBT 104, since the circulating current increases, the zero voltage switching at the time of turning on the IGBT 101 can be realized even in the case of the small load. Order of the timing for turning on the MOSFET 202 and the timing for turning off the IGBT 104 is not limited. If the MOSFET 204 is turned off, since its breaking current is commutated to the diode 212, the zero voltage switching of the turn-on of the MOSFET 202 can be also performed. This is true of the periods of time f1 and g1. Therefore, the above operating method has an effect of improving the efficiency even at the time of the small load.

In the step-down operation 1 described above, a time-dependent ratio of the period of time during which the IGBTs 101 and 104 are simultaneously in the ON state and a time-dependent ratio of the period of time during which the IGBTs 102 and 103 are simultaneously in the ON state are changed, thereby adjusting the output electric power. Such a time-dependent ratio is called a duty. The larger the duty is, the larger electric power can be outputted. Therefore, in the step-down operation 1, when the ON/OFF states of the IGBTs 101 and 104 coincide and the ON/OFF states of the IGBTs 102 and 103 coincide, that is, when the duty is maximum, the output electric power becomes maximum. In the case of setting the output electric power to be further larger than that in the above state, the step-down operation 2, which will be described hereinbelow is applied.

[Step-Down Operation 2]

Figure 3:
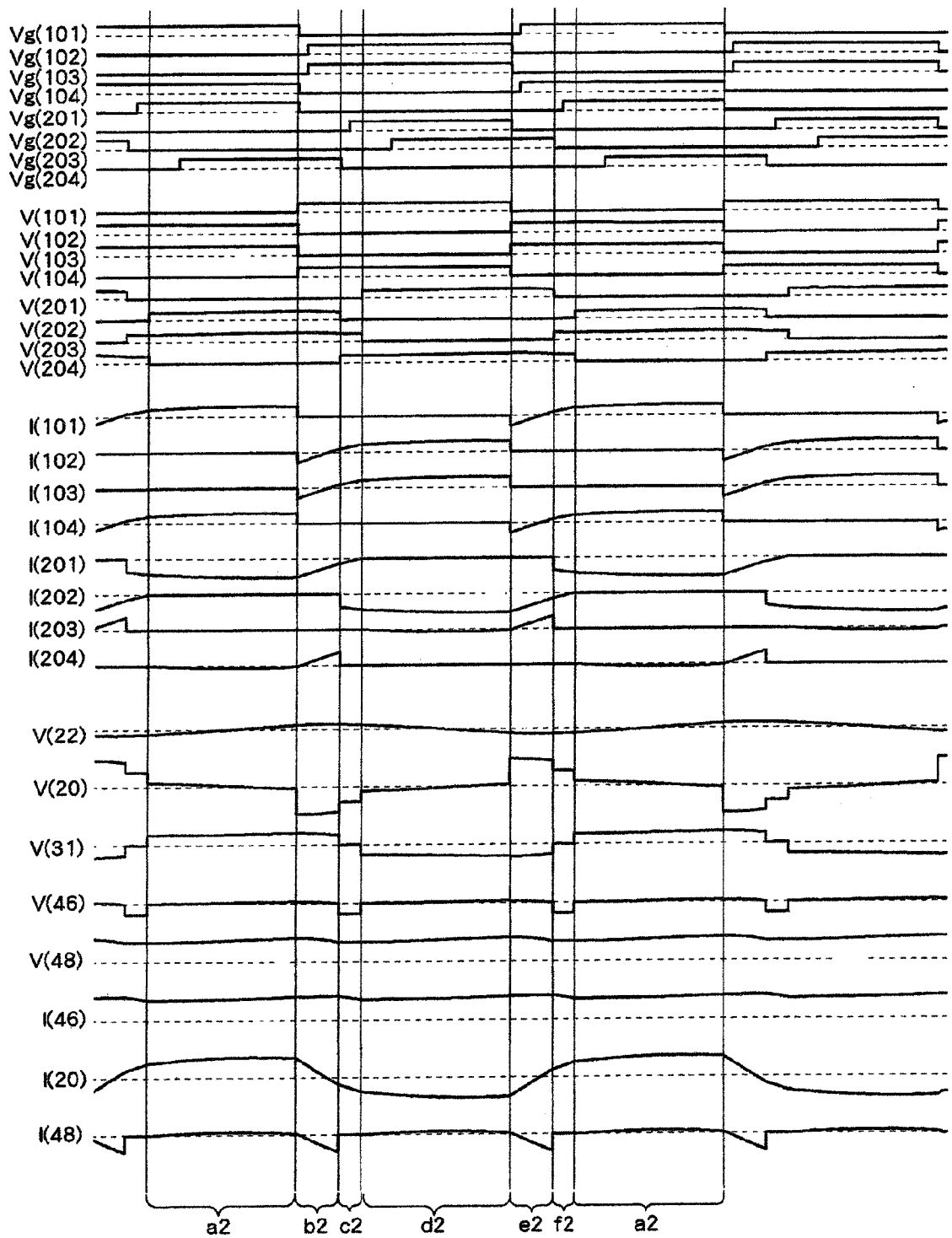
FIG. 3 is a voltage/current waveform diagram for describing the step-down operation 2 of the bi-directional DC-DC converter according to the embodiment of the invention.

FIG. 3 is a voltage/current waveform diagram for describing the step-down operation 2. The step-down operation 2 will be described in detail hereinbelow with reference to FIG. 3. In FIG. 3, a2 to f2 correspond to the periods of time a2 to f2.

(Period of Time a2)

The operation for the period of time a2 is similar to that for the period of time a1 of the step-down operation 1 mentioned above and its detailed explanation is omitted here.

(Period of Time b2)

As mentioned above, the ON/OFF states of the IGBTs 101 and 104 coincide in the step-down operation 2. When the IGBTs 101 and 104 are turned off, the current I(20) discharges the snubber capacitor 122 while charging the snubber capacitor 121 and discharges the snubber capacitor 123 while charging the snubber capacitor 124. When the voltage V(102) reaches the zero voltage, the diode 112 is made conductive. When the voltage V(103) reaches the zero voltage, the diode 113 is made conductive. At this time, the IGBTs 102 and 103 are turned on (zero voltage switching).

The current I(20) flows through the diode 112, resonance capacitor 22, resonance reactor 20, primary winding 31, and diode 113 and reaches the power source 10. Since the MOSFET 204 is in the ON state, the current I(20) is negative, and voltage V(201) is equal to the zero voltage, the voltage V(48) in the clamping capacitor 48 is applied to the secondary windings 32 and 33. The voltage of the power source 10 is applied to the resonance reactor 20 and the current I(20) decreases. At this time, since the voltage developed in the primary winding 31 is also additionally applied to the resonance reactor 20, a decreasing speed of the current I(20) is higher than that for each of the periods of time b1 and d1 in the step-down operation 1. The voltage developed in the primary winding 31 is almost equal to the voltage of the power source 10 here. The voltage has also been developed in the resonance capacitor 22 in the same direction as that of the voltage developed in the primary winding 31. The voltage which is twice or more times as high as the voltage of the power source 10 is applied to the resonance reactor 20.

Since the IGBTs 102 and 103 are in the ON state, after the current I(20) reached the zero voltage, a magnitude of the current I(20) increases in the reverse direction. At this time, Since the MOSFET 204 is in the ON state and the voltage have been developed in the secondary winding 32, in a manner similar to the period of time a2, the voltage is applied to the smoothing reactor 46, the current I(46) increases gradually, and the energy is supplied to the power source 40.

(Period of Time c2)

When the MOSFET 204 is turned off, the discharge of the clamping capacitor 48 is finished and the voltage in the primary winding 31 is not additionally applied to the resonance reactor 20. Therefore, the increase in magnitude of the current I(20) becomes gentle. The current which has been flowing in the MOSFET 204 is commutated to the diode 212. At this time, by turning on the MOSFET 202, the synchronous rectification is performed.

The energy accumulated in the smoothing reactor 46 is supplied to the power source 40 and the current I(46) decreases gradually.

The current flowing in the diode 211 (MOSFET 201) and the secondary winding 32 decreases and the current flowing in the diode 212 (MOSFET 202) and the secondary winding 33 increases. The MOSFET 201 is turned off before the current flowing in the secondary winding 32 reaches zero (the current flowing in the secondary winding 33 reaches the current I(46)).

(Period of Time d2)

The operation for the period of time d2 is similar to that for the period of time e1 of the step-down operation 1 and its detailed explanation is omitted here. The operation for the period of time d2 is symmetrical with that for the period of time a2. Subsequently, after the periods of time e2 and f2, the operation cycle is returned to the period of time a2. Since the operations for the periods of time e2 and f2 are symmetrical with those for the periods of time b2 and c2, their detailed description is omitted here.

Also in the step-down operation 2, in a manner similar to the step-down operation 1, the resonance capacitor 22 has an effect of increasing the output electric power. The voltage clamping circuit has such an effect that elements of a low withstanding voltage can be used as diodes 211 and 212 and MOSFETs 201 and 202.

In the step-down operation 2, it is a feature that not only for the periods of time a2 and d2 but also for the periods of time b2 and e2, the positive voltage is applied to the smoothing reactor 46 and the voltage which is twice or more times as high as the voltage of the power source 10 is applied to the resonance reactor 20 and a change ratio of the current I(20) is increased, thereby extending the periods of time a2 and d2. Particularly, it is a feature that even after the polarity of the current I(20) was inverted, the voltage which is twice or more times as high as the voltage of the power source 10 is applied to the resonance reactor 20. If the resonance capacitor 22 is not provided, the voltage which is applied to the resonance reactor 20 is equal to a voltage which is about twice as high as the voltage of the power source 10. Thus, a point that the electric power larger than the maximum output electric power in the step-down operation 1 can be outputted is a maximum advantage.

In the step-down operation 2, the ON/OFF states of the IGBTs 101 and 104 coincide, the ON/OFF states of the IGBTs 102 and 103 coincide as mentioned above, and the duty is maximum. Therefore, the output electric power is adjusted by changing the durations of the periods of time b2 and e2, that is, by changing the off timing of the MOSFETs 203 and 204.

The later the off timing of the MOSFETs 203 and 204 is delayed, the more the output electric power increases. The off timing can be delayed to a point before or after the timing when the diodes 211 and 212 are reversely recovered. The off timing of the MOSFETs 203 and 204 can be also decided by detection signals from the voltage sensors 53 and 54 for detecting the reverse recovery of the diodes 211 and 212. In this case, the periods of time c2 and f2 do not exist.

The step-up operation which is executed by the bi-directional DC-DC converter 5 will be described.

[Step-Up Operation 1]

Figure 4:
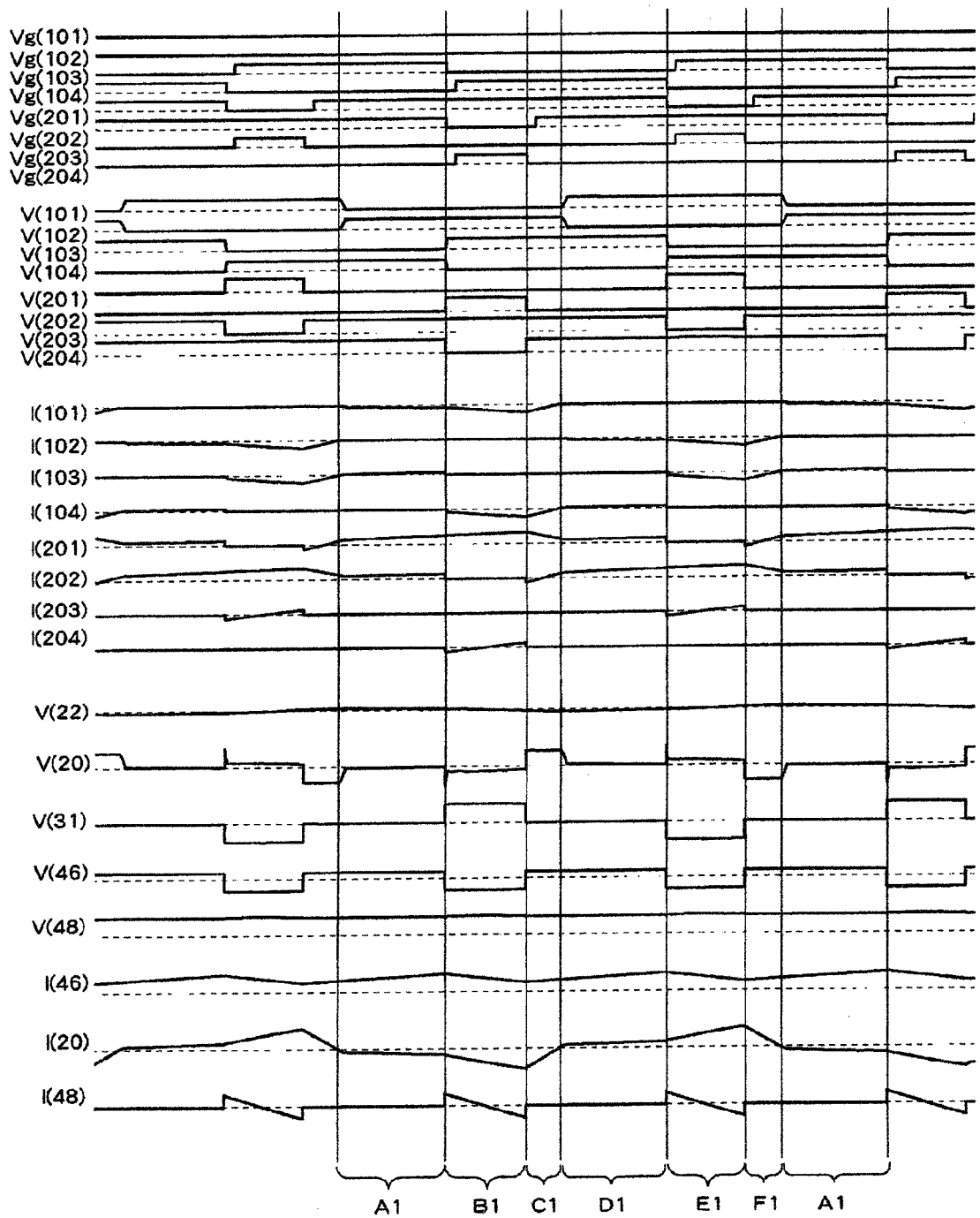
FIG. 4 is a voltage/current waveform diagram for describing the step-up operation 1 of the bi-directional DC-DC converter according to the embodiment of the invention.

FIG. 4 is a voltage/current waveform diagram for describing the step-up operation 1. The step-up operation 1 will be explained in detail hereinbelow with reference to FIG. 4. In FIG. 4, A1 to F1 denote periods of time.

(Period of Time A1)

First, for the period of time A1, the MOSFETs 201 and 202 are in the ON state and the MOSFETs 202 and 203 are in the OFF state. The voltage of the power source 40 is applied to the smoothing reactor 46 through the secondary windings 32 and 33 and MOSFETs 201 and 202 and the energy of the power source 40 is accumulated to the resonance reactor 46.

The IGBT 103 is in the ON state, the IGBTs 101, 102, and 104 are in the OFF state, and the circulating current flows on a path passing through the IGBT 103, primary winding 31, resonance reactor 20, resonance capacitor 22, and diode 111. Since the charges have been accumulated in the resonance capacitor 22 and the voltage has been developed in the direction adapted to increase the circulating current, the circulating current increases gradually.

(Period of Time B1)

When the MOSFET 202 and IGBT 103 are turned off, the current which has been flowing in the MOSFET 202 flows in the diode 214, thereby charging the clamping capacitor 48. At this time, the MOSFET 204 is turned on (zero voltage switching). The circulating current which has been flowing in the IGBT 103 discharges the snubber capacitor 124 while charging the snubber capacitor 123. When the voltage V(104) reaches the zero voltage, the diode 114 is made conductive. At this time, the IGBT 104 is turned on (zero voltage switching).

The voltage V(48) of the clamping capacitor 48 is applied to the secondary windings 32 and 33. The voltage obtained by subtracting the voltage of the power source 10 from the voltage developed in the primary winding 31 is applied to the resonance reactor 20 and the magnitude of the current I(20) increases. The current I(20) flows through the diode 114, primary winding 31, resonance reactor 20, resonance capacitor 22, and diode 111 and reaches the power source 10. The energy is supplied to the power source 10. The energy accumulated in the smoothing reactor 46 is emitted and the current I(46) decreases.

In association with an increase in magnitude of the current I(20), the charge current of the clamping capacitor 48 decreases and the discharge is performed soon.
(Period of Time C1)

When the MOSFET 204 is turned off, the discharge current of the clamping capacitor 48 which has been flowing in the MOSFET 204 makes the diode 212 conductive. At this time, the MOSFET 202 is turned on (zero voltage switching).

Since the voltage V(48) of the clamping capacitor 48 is not applied to the secondary windings 32 and 33, no voltage is developed in the primary winding 31. The voltage of the power source 10 is applied to the resonance reactor 20 and the magnitude of the current I(20) decreases. In association with it, the direction of the current I(202) is changed from the negative to the positive.

In a manner similar to the period of time A1, the voltage of the power source 40 is applied to the smoothing reactor 46 and the energy of the power source 40 is accumulated in the smoothing reactor 46.
(Period of Time D1)

Since the IGBT 104 is in the ON state and the IGBT 101 is in the OFF state, when the current I(20) reaches zero, first, the diode 111 is reversely made conductive. After that, when the diode is reversely recovered, a snubber capacitor C102 is discharged while the snubber capacitor 121 is charged. When the voltage V(102) reaches the zero voltage, the diode 112 is made conductive. For a period of time until the diode 112 is made conductive after the diode 111 was reversely made conductive, the energy of the power source 10 accumulated in the resonance reactor 20 becomes the circulating current flowing on the path passing through the diode 112, resonance capacitor 22, resonance reactor 20, primary winding 31, and IGBT 104. Since the charges have been accumulated in the resonance capacitor 22 and the voltage has been developed in the direction adapted to increase the circulating current, the circulating current increases gradually.

In a manner similar to the period of time A1, the voltage of the power source 40 is applied to the smoothing reactor 46 and the energy of the power source 40 is accumulated in the smoothing reactor 46.

The operation for the period of time D1 is symmetrical with that for the period of time A1. Subsequently, after the periods of time E1 and F1, the operation cycle is returned to the period of time A1. Since the operations for the periods of time E1 and F1 are symmetrical with those for the periods of time B1 and C1, their detailed description is omitted here.

By turning on the IGBT 101 for the periods of time A1 to C1 and turning on the IGBT 102 for the periods of time D1 to F1, the synchronous rectification is performed.

The direction of the circulating current flowing when the MOSFET 202 is turned off for the period of time B1 is equal to the direction of the energy which is sent to the power source 10 for the periods of time B1 and C1. Therefore, the larger the circulating current is, the larger output electric power is liable to be obtained. The current I(202) at the time of turning off the MOSFET 202 decreases and the energy which is lost when the MOSFET 202 is turned off can be reduced. However, by shutting off the current I(202), the energy is accumulated in the clamping capacitor. When the MOSFET 202 is turned on for the period of time C1, the zero voltage switching can be performed by using such an energy. Therefore, the larger the circulating current is, the more it is difficult to perform the zero voltage switching at the time of turning on the MOSFET 202. This is true of the period of time E1.

Therefore, in the case of the small load, since the current to be shut off is small, the zero voltage switching at the time of turning on the MOSFET 202 becomes difficult. To solve such a problem, for example, if the IGBT 103 is turned off for the period of time B1 prior to turning off the MOSFET 202, since the circulating current is reduced or reversely flows, the current to be shut off at the time of turning off the MOSFET 202 increases. Even in the case of the small load, the zero voltage switching can be realized when the MOSFET 202 is turned on. This is true of the period of time E1. Thus, the above operating method has an effect of raising the efficiency even at the time of the small load.

On the contrary, if the IGBT 103 is turned off after the MOSFET 202 was turned off, the large output electric power can be obtained. This is true of the period of time E1. The above operation will be described as a step-up operation 2 hereinafter.

In the step-up operation 1, the output electric power is adjusted by changing the time-dependent ratio (on duty) of the ON periods of time of the MOSFETs 201 and 202. If the on duty is increased, the voltage V(48) of the clamping capacitor 48 rises and the voltage developed in the primary winding 31 also rises, so that the output electric power increases. However, the voltages which are applied to the clamping capacitor 48, MOSFETs 201 to 204, and diodes 211 to 214 are determined by the voltage of the power source 40, the on duty, the wiring inductance, and the breaking currents of the MOSFETs 201 to 204. Therefore, in order to suppress the voltages which are applied to those elements, there is an upper limitation in the increase in on duty. If the output electric power is further increased in site of the fact that the on duty is equal to the upper limit, the step-up operation 2, which will be described hereinbelow, is applied.
[Step-Up Operation 2]

Figure 5:
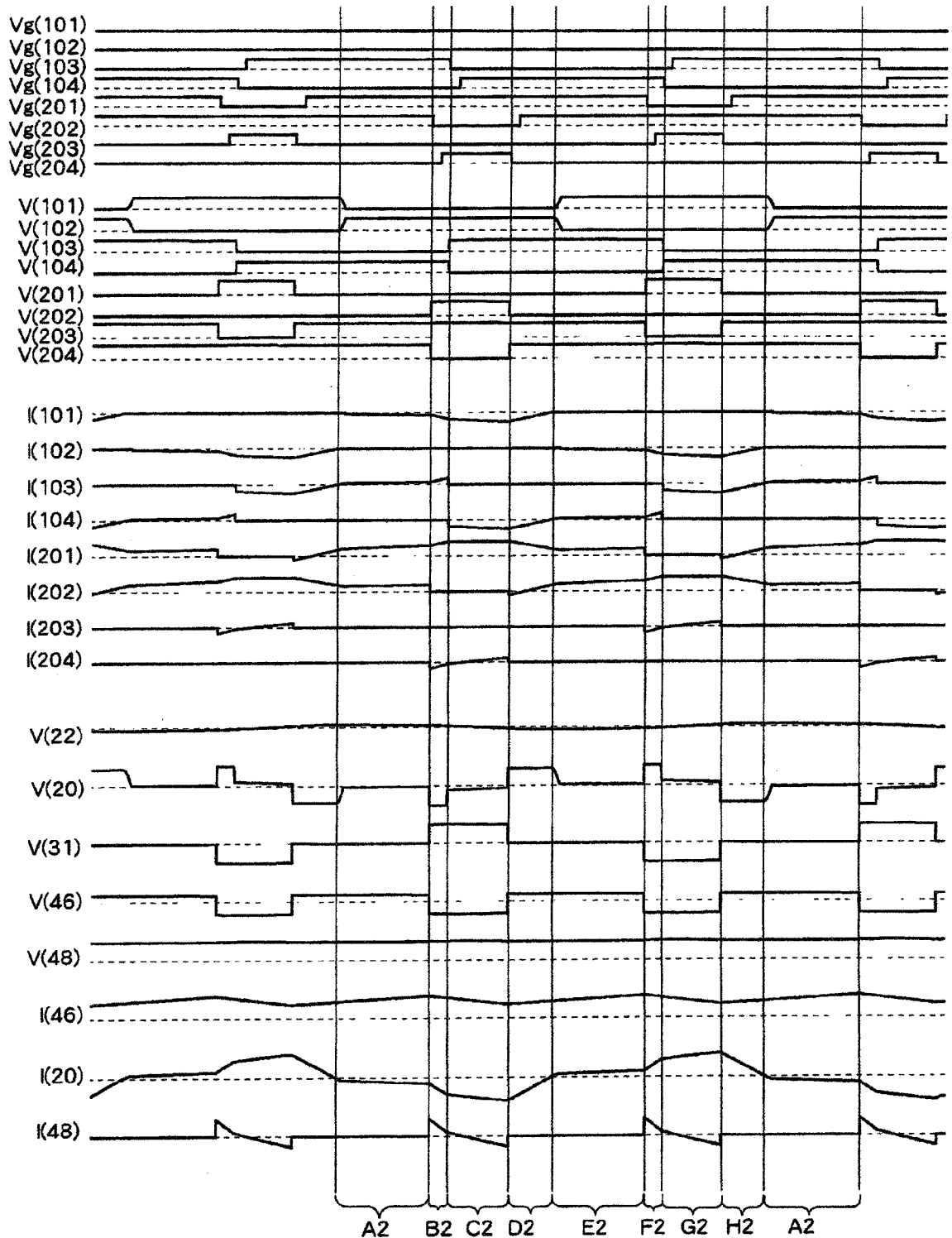
FIG. 5 is a voltage/current waveform diagram for describing the step-up operation 2 of the bi-directional DC-DC converter according to the embodiment of the invention.

FIG. 5 is a voltage/current waveform diagram for describing the step-up operation 2. The step-up operation 2 will be explained in detail hereinbelow with reference to FIG. 5. In FIG. 5, A2 to H2 denote periods of time.
(Period of Time A2)

The operation for the period of time A2 is similar to that for the period of time A1 of the step-up operation 1 and its detailed explanation is omitted here.
(Period of Time B2)

When the MOSFET 202 is turned off, the current which has been flowing in the MOSFET 202 flows in the diode 214 and charges the clamping capacitor 48. At this time, the MOSFET 204 is turned on (zero voltage switching).

Although the voltage is developed in the primary winding 31 in a manner similar to that for the period of time B1 of the step-up operation 1, different from the period of time B1 of the step-up operation 1, the IGBT 103 is in the ON state. Therefore, since the voltage obtained without subtracting the voltage of the power source 10 from the voltage developed in the primary winding 31 is applied to the resonance reactor 20, the magnitude of the current I(20) increases at a speed higher than that for the period of time B1 of the step-up operation 1.

At this time, the current I(20) flows on the same path of the circulating current as that for the period of time A2.

The energy accumulated in the smoothing reactor 46 is emitted and the current I(46) decreases.

(Period of Time C2)

When the IGBT 103 is turned off, the circulating current which has been flowing in the IGBT 103 discharges the snubber capacitor 124 while charging a snubber capacitor C103. When the voltage V(104) reaches the zero voltage, the diode 114 is made conductive. At this time, the IGBT 104 is turned on (zero voltage switching).

The voltage has been developed in the primary winding 31 in a manner similar to that for the period of time B2. The current I(20) flows through the diode 114, primary winding 31, resonance reactor 20, resonance capacitor 22, and diode 111 and reaches the power source 10. The energy is supplied to the power source 10. The energy accumulated in the smoothing reactor 46 is emitted and the current I(46) decreases.

In association with the increase in magnitude of the current I(20), the charge current of the clamping capacitor 48 decreases and the discharge is performed soon.

(Period of Time D2)

The operation for the period of time D2 is similar to that for the period of time C1 of the step-up operation 1 and its detailed explanation is omitted here.

(Period of Time E2)

The operation for the period of time E2 is similar to that for the period of time D1 of the step-up operation 1 and its detailed explanation is omitted here. The operation for the period of time E2 is symmetrical with that for the period of time A2. Subsequently, after the periods of time F2 to H2, the operation cycle is returned to the period of time A2. Since the operations for the periods of time F2 to H2 are symmetrical with those for the periods of time B2 to D2, their detailed description is omitted here.

In the step-up operation 2, the output electric power is adjusted by changing the off timing of the IGBTs 103 and 104 and by changing the duration of the periods of time B2 and F2. If the off timing of the IGBTs 103 and 104 is delayed, a change ratio of the current I(20) for each of the periods of time C2 and G2 decreases, a voltage drop due to a resonance reactor L is suppressed, and the output electric power increases. However, if the output electric power is increased by delaying the off timing of the IGBTs 103 and 104, a peak value of the current I(20) increases. The breaking currents of the MOSFETs 201 and 202 increase. Surge voltages which cannot be completely suppressed by the voltage clamping circuit are caused in the drains of the MOSFETs 201 and 202. The voltages which are applied to the MOSFETs 201 and 202 rise. There is, consequently, upper limits in the off timing of the IGBTs 103 and 104 which can be delayed.

In the case of further increasing the output electric power to a value larger than that in the step-up operation 2, it is effective to increase the circulating current to be previously allowed to flow. A step-up operation 3, which will be described hereinbelow is applied.

[Step-Up Operation 3]

Figure 6:
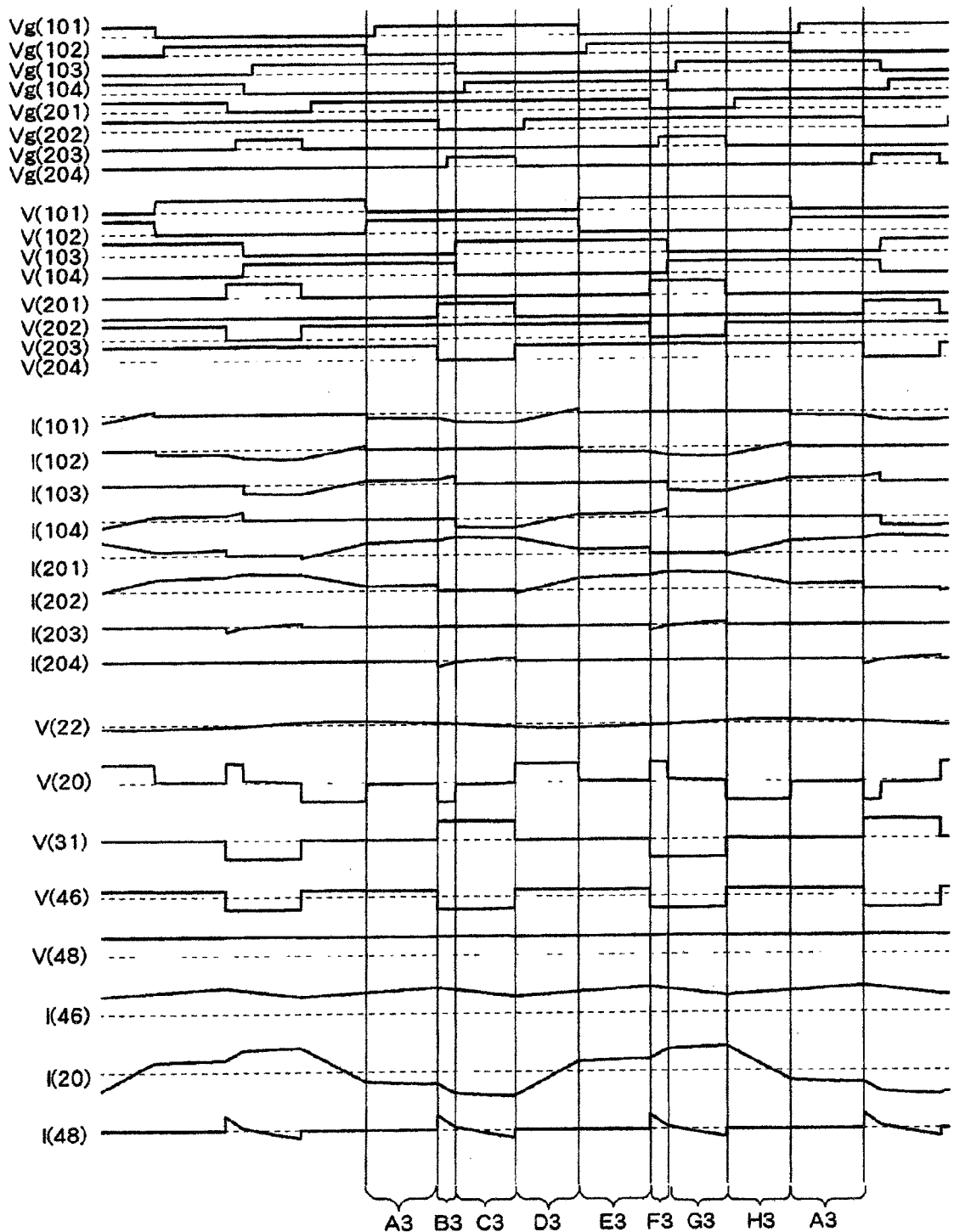
FIG. 6 is a voltage/current waveform diagram for describing the step-up operation 3 of the bi-directional DC-DC converter according to the embodiment of the invention.

FIG. 6 is a voltage/current waveform diagram for describing the step-up operation 3. The step-up operation 3 will be explained in detail hereinbelow with reference to FIG. 6. In FIG. 6, A3 to H3 denote periods of time.

(Period of Time A3)

Although the operation for the period of time A3 is similar to that for the period of time A2 of the step-up operation 2 and its detailed explanation is omitted here, a larger circulating current is flowing. The IGBT 101 is in the ON state.

(Period of Time B3)

The operation for the period of time B3 is similar to that for the period of time B2 of the step-up operation 2 and its detailed explanation is omitted here.

(Period of Time C3)

The operation for the period of time C3 is similar to that for the period of time C2 of the step-up operation 2 and its detailed explanation is omitted here.

(Period of Time D3)

The operation which is executed for a period of time until the magnitude of the current I(20) decreases and reaches zero is similar to that for the period of time D2 of the step-up operation 2 and its detailed explanation is omitted here. After that, since the IGBTs 101 and 104 are in the ON state, the direction of the current I(20) is reversed and the current I(20) increases. The energy of the power source 10 is accumulated in the resonance reactor 20.

(Period of Time E3)

When the IGBT 101 is turned off, the current I(20) discharges the snubber capacitor 122 while charging the snubber capacitor 121. When the voltage V(102) reaches the zero voltage, the diode 112 is made conductive. At this time, by turning on the IGBT 102, the zero voltage switching is performed. Other operations are similar to those for the period of time E2 of the step-up operation 2 and their detailed explanation is omitted here.

The operation for the period of time E3 is symmetrical with that for the period of time A3. Subsequently, after the periods of time F3 to H3, the operation cycle is returned to the period of time A3. Since the operations for the periods of time F3 to H3 are symmetrical with those for the periods of time B3 to D3, their detailed description is omitted here.

In the step-up operation 3, the durations of the periods of time D3 and H3 are changed. That is, the output electric power is adjusted by changing the off timing of the IGBTs 101 and 102. If the off timing of the IGBTs 101 and 102 is delayed, the circulating currents for the periods of time A3 and E3 increase and the output electric power increases.

As mentioned above, in the step-up operations 1 to 3, the voltage clamping circuit accumulates the energy of the current which is shut off when the MOSFETs 201 and 202 are turned off, thereby suppressing that the surge voltage is generated in the drain voltage of each of the MOSFETs 201 and 202. Therefore, the voltage clamping circuit has such an effect that elements of a low withstanding voltage can be used as diodes 211 and 212 and MOSFETs 201 and 202.

The voltage has been developed in the resonance capacitor 22 in the direction adapted to increase the circulating current for the period of time during which the circulating current flows. Therefore, the resonance capacitor 22 has an effect of increasing the output electric power.

The foregoing step-down operations 1 and 2 and the foregoing step-up operations 1, 2, and 3 can be also switched and executed, respectively. The switching of the step-down operations and step-up operations of the bi-directional DC-DC converter 5 will be described hereinbelow.

The switching of the step-down operations 1 and 2 will be described. First, the step-down operation 1 is applied at the small load. Such an operation that the MOSFET 203 is turned off prior to turning off the IGBT 103, the MOSFET 204 is turned off prior to turning off the IGBT 104, and the circulating current is increased is executed. The duty increases in association with an increase in load. A time difference between the off timing of the IGBT 103 and the off timing of the MOSFET 203 and a time difference between the off timing of the IGBT 104 and the off timing of the MOSFET 204 decrease and those time differences are soon eliminated.

When the load further increases, in order to reduce the circulating current, such an operation that the MOSFET 203 is turned off after the IGBT 103 was turned off and the MOSFET 204 is turned off after the IGBT 104 was turned off is executed. When the load further increases, the duty increases and soon becomes maximum. In the case of further increasing the load to a value larger than that in the above state, the step-down operation 2 is applied. Specifically speaking, a time which is necessary until the MOSFET 203 is turned off after the IGBT 103 was turned off and a time which is necessary until the MOSFET 204 is turned off after the IGBT 104 was turned off are extended.

Subsequently, the switching of the step-up operations 1, 2, and 3 will be described. First, the step-up operation 1 is applied at the small load. Such an operation that the IGBT 103 is turned off prior to turning off the MOSFET 202, the IGBT 104 is turned off prior to turning off the MOSFET 201, and the circulating current is decreased or allowed to reversely flow is executed. The on duties of the MOSFETs 201 and 202 increase in association with the increase in load. A time difference between the off timing of the MOSFET 202 and the off timing of the IGBT 103 and a time difference between the off timing of the MOSFET 201 and the off timing of the IGBT 104 decrease and those time differences are soon eliminated. When the load further increases, the on duty reaches an upper limit. The reason why there is an upper limit in the on duty has already been described in the explanation of the step-up operation 1. In the case of further increasing the load to a value larger than that in the above state, the step-up operation 2 is applied. Specifically speaking, a time which is necessary until the IGBT 103 is turned off after the MOSFET 202 was turned off and a time which is necessary until the IGBT 104 is turned off after the MOSFET 201 was turned off are extended. When the load further increases, the duration of the time reaches an upper limit. The reason why there is an upper limit in the duration of the time has already been described in the explanation of the step-up operation 2. In the case of further increasing the load to a value larger than that in the above state, the step-up operation 3 is applied.

It is a common point among a plurality of operations is that the IGBTs 101 to 104 and the MOSFETs 201 to 204 are operated so as to control the current I(20) flowing in the resonance reactor 20.

As mentioned above, the bi-directional DC-DC converter 5 according to the embodiment of the invention has such a feature that, in the cases of both of the step-down operation and the step-up operation, by switching a plurality of operations in accordance with a load state, the small insulating type bi-directional DC-DC converter in which the high efficiency and high output are obtained even in the case of the small load can be realized.

The invention is not limited to the foregoing embodiments. Naturally, the invention can be also applied to various circuit constructions in which, for example, a current doubler synchronous rectifying circuit may be used in place of the switching circuit on the low voltage side, the switching elements of the switching circuit on the low voltage side are constructed in a full bridge form, and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A bi-directional DC-DC converter which comprises a high voltage side switching circuit, connected between a first DC power source and a transformer, for executing an electric power conversion between a direct current and an alternating current, a low voltage side switching circuit, connected between a second DC power source and said transformer, for executing an electric power conversion between a direct current and an alternating current, and a control circuit for controlling ON/OFF of switching elements included in each of said switching circuits and in which an electric power is transmitted and received between said first and second DC power sources, wherein said high voltage side switching circuit includes:
a first vertical arm in which a first upper arm switching element and a first lower arm switching element are serially connected,
a second vertical arm in which a second upper arm switching element and a second lower arm switching element are serially connected,
a first smoothing capacitor connected in parallel to said first and second vertical arms and said first DC power source, and
an object connected in series which is connected between a series node of said first upper arm switching element and said first lower arm switching element and a serial node of said second upper arm switching element and said second lower arm switching element and which is comprised of a resonance capacitor, a resonance reactor, and a primary winding of said transformer, said low voltage side switching circuit includes:
a first switching element group which is connected to said second DC power source and a secondary winding of said transformer and includes a plurality of switching elements,
a smoothing reactor connected to said first switching element group and/or the secondary winding of said transformer,
a second smoothing capacitor in which one end is connected to one end of the switching elements included in said first switching element group and the other end is connected to one end of said smoothing reactor and which is connected in parallel to said second DC power source, and
a voltage clamping circuit which is connected to the switching elements included in said first switching element group and has a second switching element group including at least one switching element and a clamping capacitor, and wherein:

said control circuit is further configured to switch a polarity of DC voltage of the DC power source to be supplied to a series circuit including the resonance capacitor, the resonance reactor and the primary winding of said transformer so that voltage of the clamping capacitor can be applied to the secondary wiring of said transformer.

2. A bi-directional DC-DC converter which comprises a high voltage side switching circuit, connected between a first DC power source and a transformer, for executing an electric power conversion between a direct current and an alternating current, a low voltage side switching circuit, connected between a second DC power source and said transformer, for executing an electric power conversion between a direct current and an alternating current, and a control circuit for controlling ON/OFF of switching elements included in each of said switching circuits and in which an electric power is transmitted and received between said first and second DC power sources, wherein said high voltage side switching circuit includes:

a first vertical arm in which a first upper arm switching element and a first lower arm switching element are serially connected, a second vertical arm in which a second upper arm switching element and a second lower arm switching element are serially connected, a first smoothing capacitor connected in parallel to said first and second vertical arms and said first DC power source, and an object connected in series which is connected between a series node of said first upper arm switching element and said first lower arm switching element and a serial node of said second upper arm switching element and said second lower arm switching element and which is comprised of a resonance capacitor, a resonance reactor, and a primary winding of said transformer, said low voltage side switching circuit includes:

a first switching element group which is connected to said second DC power source and a secondary winding of said transformer and includes a plurality of switching elements, a smoothing reactor connected to said first switching element group and/or the secondary winding of said transformer, a second smoothing capacitor in which one end is connected to one end of the switching elements included in said first switching element group and the other end is connected to one end of said smoothing reactor and which is connected in parallel to said second DC power source, and a voltage clamping circuit which is connected to the switching elements included in said first switching element group and has a second switching element group including at least one switching element and a clamping capacitor, and, wherein:

said control circuit is further configured to control the first DC power source to discharge energy stored in the first DC power source for charging a resonance reactor.

* * * * *